Sept. 20, 1932.  E. GESSNER  1,878,486
VARIABLE SPEED TRANSMISSION MECHANISM
Filed Oct. 2, 1931  4 Sheets-Sheet 1

Inventor
Ernst Gessner
By attorneys.

INVENTOR.
Ernst Gessner

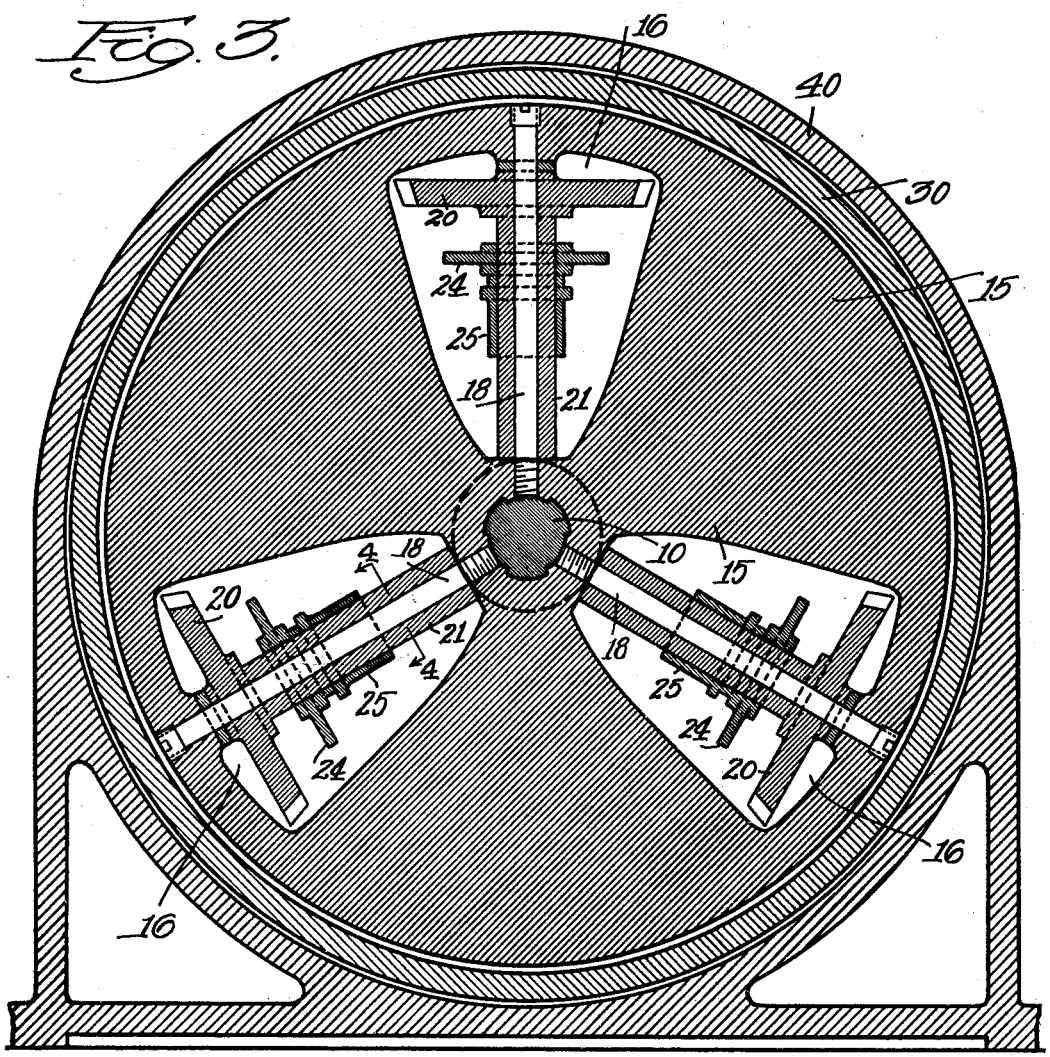
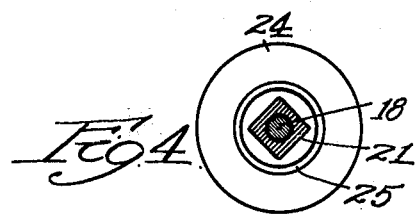

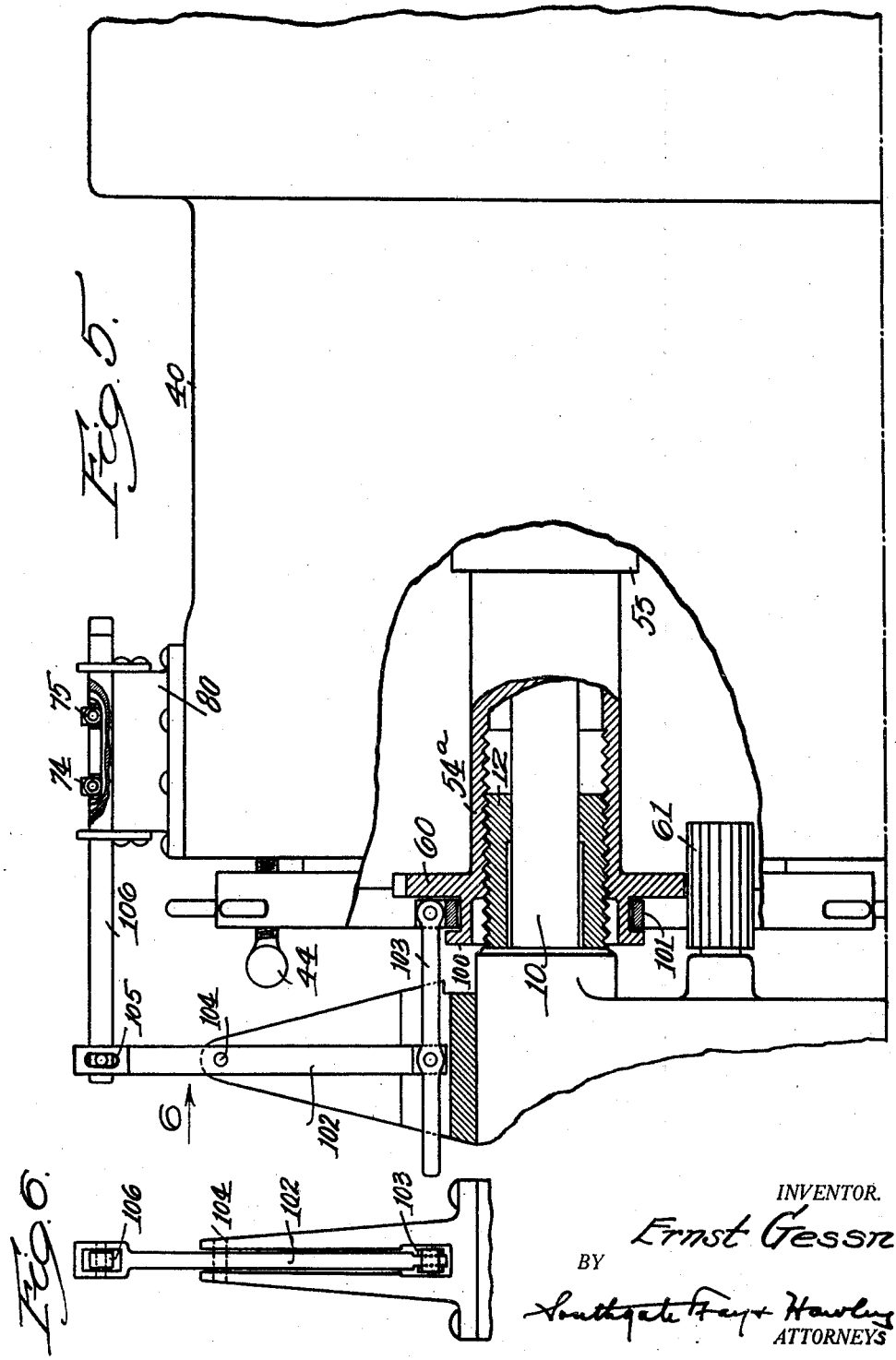

Patented Sept. 20, 1932

1,878,486

UNITED STATES PATENT OFFICE

ERNST GESSNER, OF WORCESTER, MASSACHUSETTS

VARIABLE SPEED TRANSMISSION MECHANISM

Application filed October 2, 1931. Serial No. 566,501.

This invention relates to variable speed transmission mechanism and particularly to the provision of devices which allow the driven mechanism to over-run the driving element. Such devices permit so-called "free-wheeling" if the transmission mechanism is used in an automobile or motor-boat.

It is the general object of my invention to improve the construction of such transmission mechanisms and particularly to provide for free over-running of the driven mechanism when the latter is rotated in either a forward or a rearward direction.

My invention further relates to arrangements and combinations of parts which will be hereinafter described and more particularly pointed out in the appended claims.

A preferred form of the invention, together with a slight modification thereof, is shown in the drawings, in which Fig. 1 is a sectional side elevation of my improved transmission mechanism;

Figs. 2 and 3 are transverse sectional elevations, taken along the lines 2—2 and 3—3 in Fig. 1 respectively;

Fig. 4 is a detail sectional view, taken along the line 4—4 in Fig. 3;

Fig. 5 is a side elevation, partly in section, showing a modified construction, and Fig. 6 is a detail end elevation of certain parts, looking in the direction of the arrow 6 in Fig. 5.

Figure 1:
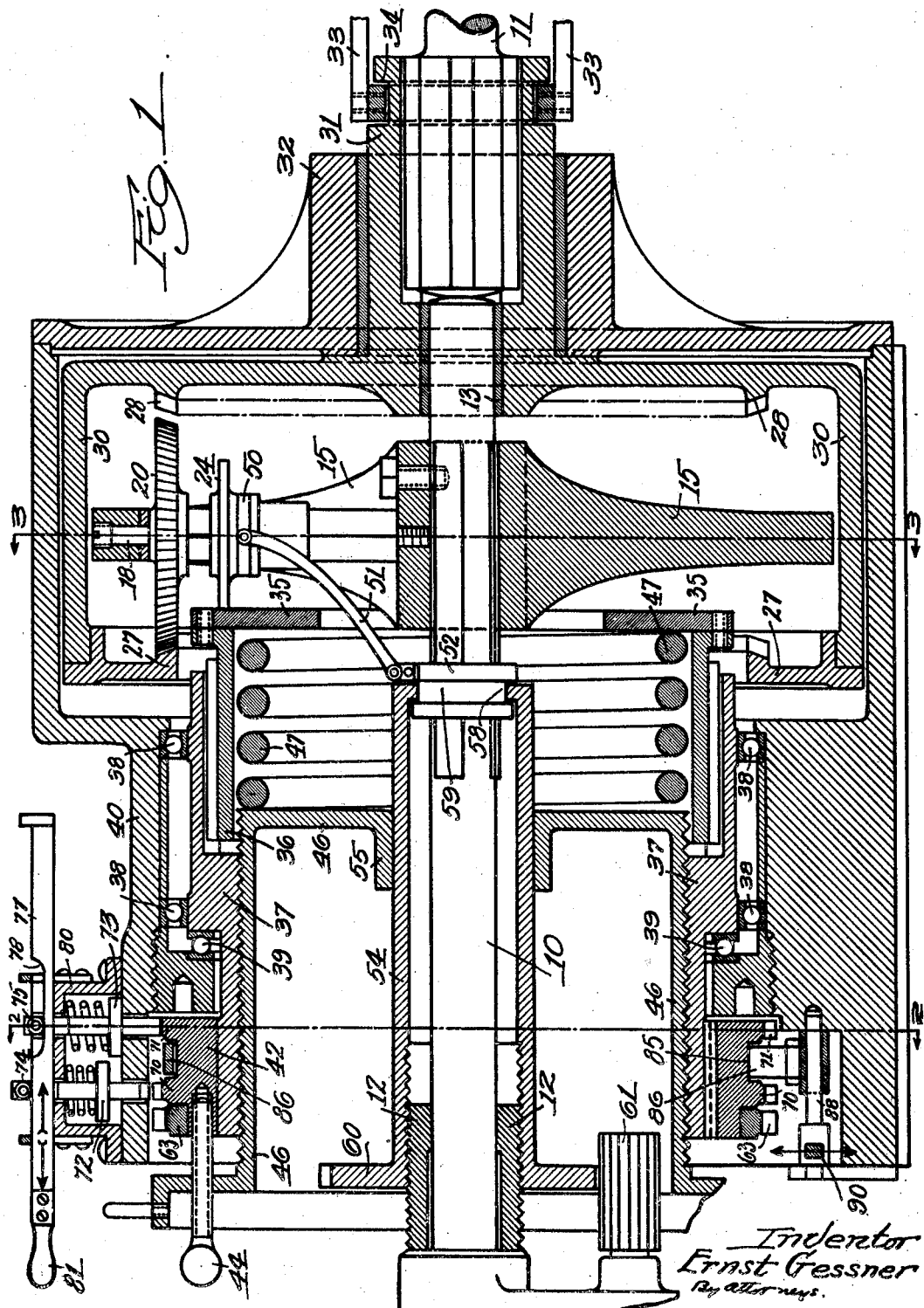

Referring to the drawings, I have shown a variable speed transmission mechanism which is of the general type disclosed in my prior Patent #1,797,953, issued March 24, 1931.

In this transmission mechanism I provide a driving shaft 10 and a driven shaft 11. The driving shaft 10 is rotatable in suitable bearings 12 and 13 and supports a rotating member or carrier 15 provided with a plurality of openings 16 (Fig. 3) through which extend radially disposed rods 18, the inner ends of which are preferably threaded in the hub portion of the carrier 15.

Bevel pinions 20 are mounted in the openings 16 and are provided with extended hub portions 21 freely rotatable on the rods 18. Friction discs 24 are provided with extended hub portions 25 slidable but non-rotatable on the hub portions 21 of the bevel pinions 20. The hub portions 21 are preferably rectangular in cross section, as shown in Fig. 4, and the openings in the hub portions 25 of the discs 24 are of corresponding cross section.

The bevel pinions 20 are adapted to engage ring gears 27 or 28 formed on the opposite inner faces of a casing 30 having a hub portion 31 rotatable in a fixed bearing 32 and containing the driving shaft bearing 13 previously described.

The hub portion 31 has a sliding but non-rotatable or keyed connection with the driven shaft 11. Yoke members 33 (Fig. 1) engage a groove 34 in the hub portion 31 and afford means by which the casing 30 may be shifted axially to bring the bevel gears 27 and 28 selectively into engagement with the bevel pinions 20.

The friction discs 24 engage a friction plate 35 mounted on the end of a sleeve 36 slidable but non-rotatable in a supporting member 37. The member 37 may be supported by suitable ball and thrust bearings 38 and 39 in an external fixed frame member 40. A ring 42 is fixed on the supporting member 37 and is recessed to receive a locking pin 44 mounted in a bearing opening in a combined supporting and adjusting member 46. The pin 44 prevents relative movement of the parts 37 and 46 when the pin is in normal locking position.

A coil spring 47 is interposed between the inner end of the member 46 and the adjacent face of the friction plate 35. By withdrawing the pin 44 and turning the member 46, said member may be adjusted axially relative to the supporting member 37, thus varying and controlling the pressure of the spring 47.

The friction discs 24 are provided with yoke members or rings 50 connected by links 51 to a collar 52 (Fig. 1) slidable but non-rotatable on the driving shaft 10. A sleeve 54 is rotatably mounted in a bearing portion 55 of the support 46 and one end of the sleeve 54 is internally threaded to fit a screw-threaded external portion of the fixed bearing 12 previously described.

One end of the sleeve 54 is provided with portions 58 projecting inwardly into a groove 59 in the sliding collar 52. The other end of the sleeve 54 is preferably provided with a flange forming a gear 60 engaged by a pinion 61 mounted for manual rotation.

By turning the pinion 61, the sleeve 54 may be correspondingly rotated and will be thereby adjusted axially, due to its threaded engagement with the fixed supporting bearing 12. Such axial adjustment causes corresponding radial adjustment of the friction discs 24 relatively to the friction plate 35, thus changing the rate of rotation of the bevel pinions 20 for a given speed of rotation of the driving shaft 10.

While the mechanism is more commonly used with the supporting member 37 held from rotation, I have provided a toothed or gear section 63 (Fig. 1) on the ring 42, adapted to be engaged by a pinion 64 (Fig. 2) by which positive rotation in one direction or the other may be given to the supporting member 37 and hence to the friction plate 35 or by which power may be taken out of the machine if desired.

The construction thus far described is in general similar to that shown in my prior patent above noted, to which reference is made for a more complete description.

Briefly stated, the operation of this mechanism is as follows: Assuming that the friction plate 35 is held from rotation and that the driving shaft 10 is rotated, the friction discs 24 will be moved in a circular path in contact with the friction plate 35 and will be rotated by such contact at a definite speed about their own axes, this speed depending upon the radial adjustment of the friction discs. The bevel pinions 20 will be correspondingly rotated and will cause rotation of the member 30 and driving shaft 11 in one direction or the other, depending on the radial position of the discs 24 and on the selective engagement of the pinions 20 with the bevel ring gears 27 or 28. By adjusting the discs 24 radially, the rate of rotation of the driven shaft 11 may be varied and by adjustment beyond neutral position, the direction of rotation may be reversed.

It is the particular object of my present invention to provide for free over-running of the driven mechanism relative to the driving mechanism in various speed relations of the several parts. For this purpose I provide ratchets 70 and 71 on the ring gear 42, with the teeth thereof facing in opposite directions, as clearly shown in Fig. 2.

I also provide spring-pressed pawls or latches 72 and 73, mounted for yielding radial movement in the casing 40. These pawls 72 and 73 engage the ratchets 70 and 71 and prevent free rotation thereof in one direction or the other.

In order to render the latches 72 and 73 selectively operative, I provide rolls 74 and 75 on the outer ends of the latches, positioned for engagement by a cam bar 77 having a recess 78. The cam bar 77 is slidable endwise in a fixed supporting frame member 80 and is provided with a handle 81 by which it may be manipulated.

When the cam bar 77 is in the position shown in Fig. 1, the latch 73 is operative to engage the teeth of the ratchet 71, while the latch 72 is raised and inoperative. Movement of the cam bar 77 to the left in Fig. 1 will release the latch 72 and allow the same to engage the teeth of the ratchet 70. When in this position, with both latches 72 and 73 operative, the support 37 and disc 35 are held from rotation in either direction, and no over-running or free-wheeling is permitted.

Continued movement of the cam bar 77 to the left will raise the latch 73 to inoperative position, leaving the latch 72 and ratchet 70 operative. On the other hand, movement of the cam bar 77 in either direction to extreme position will raise both latches and will leave the ring 42, support 37 and disc 35 free to rotate unless otherwise controlled.

Figure 2:
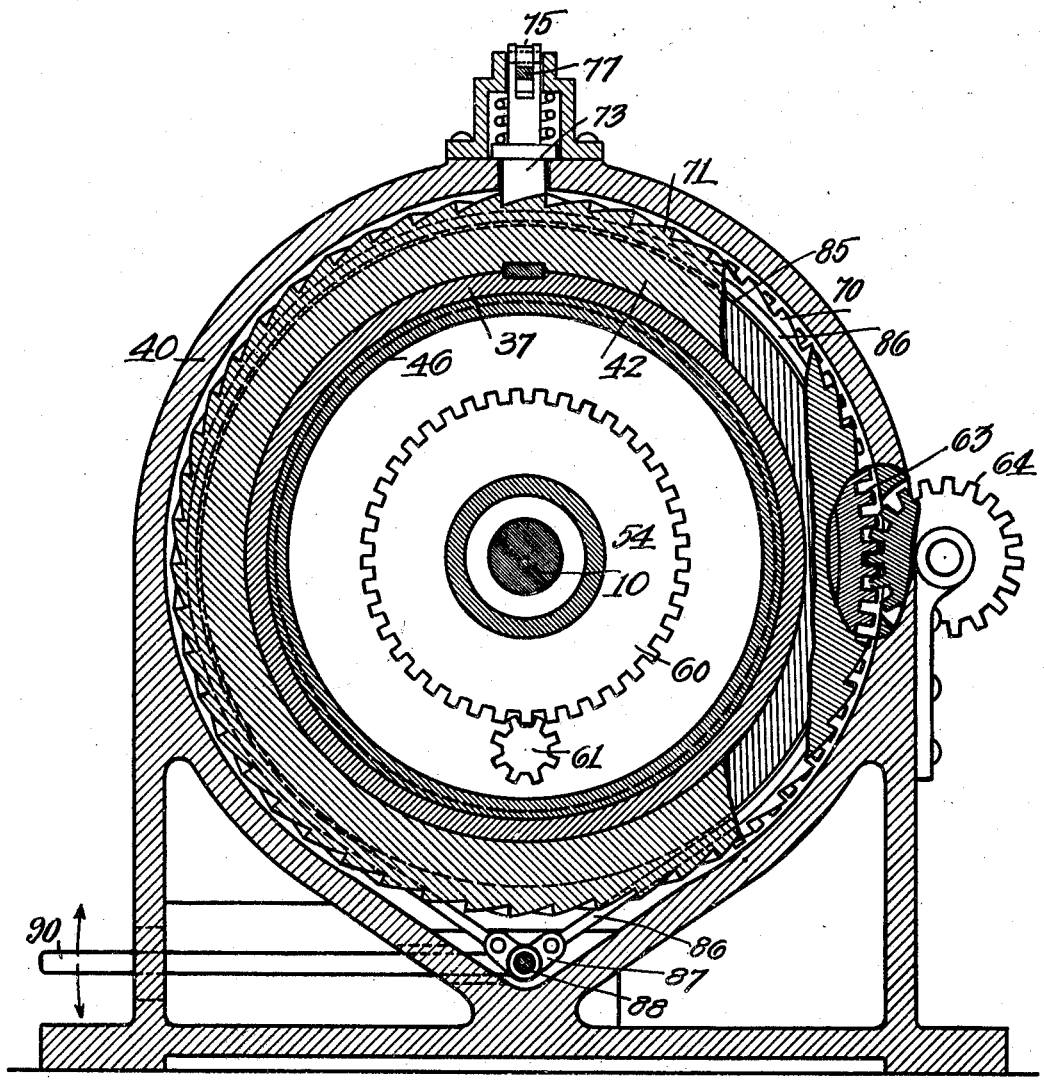

Such free rotation may be prevented by controlling or preventing rotation of the pinion 64 (Fig. 2). If the pinion 64 is held stationary, the friction disc 35 will also be stationary, and if the pinion 64 is rotated at a given speed, the disc 35 will be correspondingly rotated at a proportionate speed.

It is necessary to provide two oppositely facing ratchets 70 and 71 and latches 72 and 73 in order to permit over-running or free-wheeling throughout the whole range of radial adjustment of the friction discs 24. As fully explained in my prior patent, the driven shaft 11 will be rotated in the same direction as the driving shaft 10 when the bevel pinions 20 engage the ring gear 28, and also when the bevel pinions 20 engage the ring gear 27 and the friction discs 24 are adjusted inward toward the axis of the driving shaft and inside of the neutral position.

At a certain definite radial position called the neutral position, the discs 24 will roll on the friction plate 35 at the same angular speed at which the pinions 20 roll on the ring gear 27, and consequently the ring gear 27 and driven shaft 11 will be held stationary. But when the friction discs 24 are adjusted outward beyond the neutral position, the shaft 11 will be driven in a direction reverse to that of the driving shaft.

When the driven shaft is rotating in the same direction as the driving shaft, the ratchet 70 and latch 72 are used to permit over-running or free-wheeling, and when the driven shaft rotates in the reverse direction, the ratchet 71 and latch 73 are used.

When the device is used in driving an automobile, it is desirable to be able to prevent free-wheeling whenever desired. For this purpose I provide the ring 42 with a cylindrical or drum portion 85 (Figs. 1 and 2) which drum portion is engaged by a brake-band 86 having its ends secured to a lever 87 (Fig. 2) mounted on a rock shaft 88.

An operating arm 90 on the shaft 88 extends out through the frame 40 and may be manually operated to tighten the brake-band 86 whenever desired. I am thus able to prevent free-wheeling at will.

In Figs. 5 and 6, I have shown a construction by which the latches 72 and 73 are automatically rendered operative in accordance with the radial position of the friction discs. For this purpose, I provide a grooved extension 100 (Fig. 5) at the outer end of the sleeve 54ª and I connect a ring 101 positioned in the grooved extension 100 to a lever 102 by means of a link 103.

The lever 102 is mounted on a fixed pivot 104 and has a pin and slot connection at 105 to the cam bar 106. When the sleeve 54ª is adjusted axially to change the radial position of the friction discs, the lever 102 will be moved to shift the cam bar 106 and to render one or the other of the ratchets and corresponding latches operative in accordance with the position of the friction discs 24 and without attention by the operator.

When the fixed discs are positioned toward the axis of the driving shaft, a certain one of the ratchets and latches will be operative, and when the discs are moved outward beyond neutral position, the other ratchet and latch will be rendered operative, while at the same time the first-mentioned ratchet and latch will become inoperative.

I thus provide for over-running or free-wheeling in every effective position of the friction discs. I also provide brake mechanism for temporarily preventing free-wheeling at any desired time and I provide means by which both ratchets and latches may be rendered operative to positively prevent free rotation of the disc 35 in either direction. I also provide for rotating the friction plate 35 positively at any desired speed by means of the gear 63 and pinion 64, at the same time rendering both latches inoperative. In case the free-wheeling, the pinion 64 is driven and the superfluous power may be utilized for any desired purpose.

Having thus described my invention and the advantages thereof, I do not wish to be limited to the details herein disclosed, otherwise than as set forth in the claims, but what I claim is:—

1. Variable speed transmission mechanism comprising a driving member, a driven member, a carrier rotatable with said driving member, a plurality of angularly spaced friction discs rotatably mounted in said carrier, pinions rotatable with said discs, gears engageable by said pinions and connected to rotate said driven member, means to simultaneously adjust said friction discs radially, a friction plate engaged by said friction discs and mounted to rotate about the axis of the driving member, and means effective to prevent rotation of said friction plate in one direction but leaving said plate free to rotate in the opposite direction.

2. Variable speed transmission mechanism comprising a driving member, a driven member, a carrier rotatable with said driving member, a plurality of angularly spaced friction discs rotatably mounted in said carrier, pinions rotatable with said discs, gears engageable by said pinions and connected to rotate said driven member, means to simultaneously adjust said friction discs radially, a friction plate engaged by said friction discs and mounted to rotate about the axis of the driving member, means effective to prevent rotation of said friction plate in one direction but leaving said plate free to rotate in the opposite direction, and a device by which said latter means may be rendered operative or inoperative.

3. Variable speed transmission mechanism comprising a driving member, a driven member, a carrier rotatable with said driving member, a plurality of angularly spaced friction discs rotatably mounted in said carrier, pinions rotatable with said discs, gears engageable by said pinions and connected to rotate said driven member, means to simultaneously adjust said friction discs radially, a friction plate engaged by said friction discs and mounted to rotate about the axis of the driving member, a device permitting free rotation of said friction plate in a first direction but preventing rotation of said plate in a second direction, a second device permitting free rotation of said friction plate in said second direction but preventing rotation of said plate in said first direction, and selective means to render either device operative.

4. The combination in variable speed transmission mechanism as set forth in claim 3, in which said selective means includes a connection to the means for radially adjusting the friction discs, whereby radial adjustment of said discs simultaneously renders said first and second devices selectively operative and inoperative.

5. The combination in variable speed transmission mechanism as set forth in claim 3, in which said selective means includes a connection to the means for radially adjusting the friction discs, said connection rendering said adjusting means effective to reverse the operative condition of said first and second devices as said discs are shifted radially.

6. Variable speed transmission mechanism comprising a driving member, a driven member, a carrier rotatable with said driving member, a plurality of angularly spaced friction discs rotatably mounted in said carrier, pinions rotatable with said discs, gears engageable by said pinions and connected to rotate said driven member, means to simultaneously adjust said friction discs radially, a friction plate engaged by said friction discs and mounted to rotate about the axis of the driving member, a device permitting free rotation of said friction plate in a first direction but preventing rotation of said plate in a second direction, a second device permitting free rotation of said friction plate in said second direction but preventing rotation of said plate in said first direction, and selective to render either device operative and the other device inoperative.

7. Variable speed transmission mechanism comprising a driving member, a driven member, a carrier rotatable with said driving member, a plurality of angularly spaced friction discs rotatably mounted in said carrier, pinions rotatable with said discs, gears engageable by said pinions and connected to rotate said driven member, means to simultaneously adjust said friction discs radially, a friction plate engaged by said friction discs and mounted to rotate about the axis of the driving member, a device permitting free rotation of said friction plate in a first direction but preventing rotation of said plate in a second direction, a second device permitting free rotation of said friction plate in said second direction but preventing rotation of said plate in said first direction, and selective means to render either or both of said devices operative or inoperative.

8. Variable speed transmission mechanism comprising a driving member, a driven member, a carrier rotatable with said driving member, a plurality of angularly spaced friction discs rotatably mounted in said carrier, pinions rotatable with said discs, gears engageable by said pinions and connected to rotate said driven member, means to simultaneously adjust said friction discs radially, a friction plate engaged by said friction discs and mounted to rotate about the axis of the driving member, ratchet means preventing clockwise rotation of said friction plate, additional ratchet means preventing anti-clockwise rotation of said plate, and a device effective to render either ratchet means operative.

9. Variable speed transmission mechanism comprising a driving member, a driven member, a carrier rotatable with said driving member, a plurality of angularly spaced friction discs rotatably mounted in said carrier, pinions rotatable with said discs, gears engageable by said pinions and connected to rotate said driven member, means to simultaneously adjust said friction discs radially, a friction plate engaged by said friction discs and mounted to rotate about the axis of the driving member, ratchet means preventing clockwise rotation of said friction plate, additional ratchet means preventing anti-clockwise rotation of said plate, and a device effective to render either or both ratchet means operative and either or both ratchet means inoperative.

10. Variable speed transmission mechanism comprising a driving member, a driven member, a carrier rotatable with said driving member, a plurality of angularly spaced friction discs rotatably mounted in said carrier, pinions rotatable with said discs, gears engageable by said pinions and connected to rotate said driven member, means to simultaneously adjust said friction discs radially, a friction plate engaged by said friction discs and mounted to rotate about the axis of the driving member, means effective to prevent rotation of said friction plate in one direction but leaving said plate free to rotate in the opposite direction, and a friction device effective to render said latter means inoperative.

11. Variable speed transmission mechanism comprising a driving member, a driven member, a carrier rotatable with said driving member, a plurality of angularly spaced friction discs rotatably mounted in said carrier, pinions rotatable with said discs, gears engageable by said pinions and connected to rotate said driven member, means to simultaneously adjust said friction discs radially, a friction plate engaged by said friction discs and mounted to rotate about the axis of the driving member, means effective to prevent rotation of said friction plate in one direction but leaving said plate free to rotate in the opposite direction, and a manually operated brake band effective to render said latter means inoperative.

In testimony whereof I have hereunto affixed my signature.

ERNST GESSNER.